US007314179B1

(12) United States Patent
Halbur et al.

(10) Patent No.: US 7,314,179 B1
(45) Date of Patent: Jan. 1, 2008

(54) STORED-VALUE CARD WITH MOVABLE GRAPHIC PORTION

(75) Inventors: Ted C. Halbur, Lino Lakes, MN (US); Travis M. Robertson, St. Louis Park, MN (US); Chad Albers, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 11/473,393

(22) Filed: Jun. 23, 2006

(51) Int. Cl.
*G06K 19/00* (2006.01)

(52) U.S. Cl. .................................................... 235/487

(58) Field of Classification Search ................ 235/380, 235/487, 492, 493; 446/147-152; 40/360; 206/459.5

See application file for complete search history.

(56) References Cited

U.S. PATENT DOCUMENTS 744,545 A 11/1903 Hervey
966,107 A 8/1910 Lowe
976,495 A 11/1910 Reeves
1,041,573 A 10/1912 Baring-Gould
1,546,928 A * 7/1925 Graham ...................... 434/150
1,618,710 A 2/1927 Hose
1,951,022 A 3/1934 Iverson
1,961,973 A * 6/1934 Jenkins ........................ 40/504
2,476,742 A 7/1949 Lareau et al.
2,573,625 A 10/1951 Swart
2,728,167 A 12/1955 Knott
2,732,655 A 1/1956 Dirckx
2,787,852 A 4/1957 Youngren
2,834,123 A * 5/1958 Knight .................. 235/61 NV
2,931,657 A * 4/1960 Lewis ........................ 273/155
3,717,942 A * 2/1973 Presby ....................... 434/402
4,054,242 A 10/1977 Strobe
4,309,839 A 1/1982 White et al.
4,341,035 A 7/1982 Jaworski et al.
6,146,721 A * 11/2000 Freynet ......................... 428/7
2002/0096873 A1* 7/2002 Scheinblum ................. 283/65
2004/0249748 A1* 12/2004 Schultz et al. ................ 705/39
2005/0061889 A1 3/2005 McGee et al.

FOREIGN PATENT DOCUMENTS

GB 2 277 482 11/1994

OTHER PUBLICATIONS

Color Copy of GiftCard with Rotating Pinwheel and Backer available at Target retail stores Dec. 26, 2004 (1 page).

(Continued)

*Primary Examiner*—Jared J. Fureman
*Assistant Examiner*—Paultep Savusdiphol
(74) *Attorney, Agent, or Firm*—Ingrassia Fisher & Lorenz, P.C.

(57) ABSTRACT

A stored-value card assembly includes a base substrate and an auxiliary member. The base substrate includes an account identifier linking the stored-value card to at least one of a financial account or a financial record. The auxiliary member is movably coupled to the base substrate and includes a first graphic portion. The auxiliary member is movable between a first position relative to the base substrate, in which the first graphic portion partially defines a first graphic, and at least a second position, in which the first graphic portion partially defines a second graphic different from the first graphic. Methods of assembling a stored-value card assembly, methods of encouraging purchase and facilitating use of a stored-value card assembly, and other embodiments are also disclosed.

28 Claims, 11 Drawing Sheets

OTHER PUBLICATIONS

TOYS “R” US; Colorforms Games Silly Faces; www.amazon.com printed on May 23, 2006 (7 pages).

Color Copy of GiftCard with Rotating Pinwheel available at Target retail stores Dec. 26, 2004 (1 page).

* cited by examiner

STORED-VALUE CARD WITH MOVABLE GRAPHIC PORTION

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card including a base substrate and an auxiliary member. The base substrate includes an account identifier linking the stored-value card to at least one of a financial account or a financial record. The auxiliary member is movably coupled to the base substrate and includes a first graphic portion. The auxiliary member is movable between a first position relative to the base substrate, in which the first graphic portion partially defines a first graphic, and at least a second position, in which the first graphic portion partially defines a second graphic different from the first graphic. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services at e.g., a retail store or website. According to one embodiment, an original consumer buys a stored-value card to give a recipient who in turn is able to use the stored-value card at a retail store or setting to pay for the goods and/or services. A stored-value card, according to embodiments of the present invention, provides the consumer and recipient with extra amusement in addition to the ability to pay for goods and/or services with the stored-value card.

In particular, the stored-value card depicts at least one graphic and provides the bearer of the stored-value card means for interchanging portions of the graphic by moving a first member of the stored-value card relative to a base substrate of the stored-value card. In one embodiment, the base substrate and the first member each depict a different portion of the at least one graphic such that when the first member is moved to a first position relative to the base substrate, the graphic portion on the first member aligns with the graphic portion on the base substrate. When the first member is moved to a second position, the graphic portion on the first member does not align with or aligns differently with the graphic portion on the base substrate to present a different overall visual presentation or graphic than presented in the first position. In one embodiment, when the first member is in the second position strange or funny graphics are presented, thereby amusing the bearer of the stored-value card. In one embodiment, this amusing aspect of the stored-value card promotes the sale, use, and/or loading of the stored-value card by potential consumers and/or bearers of the stored-value card.

Figure 1:
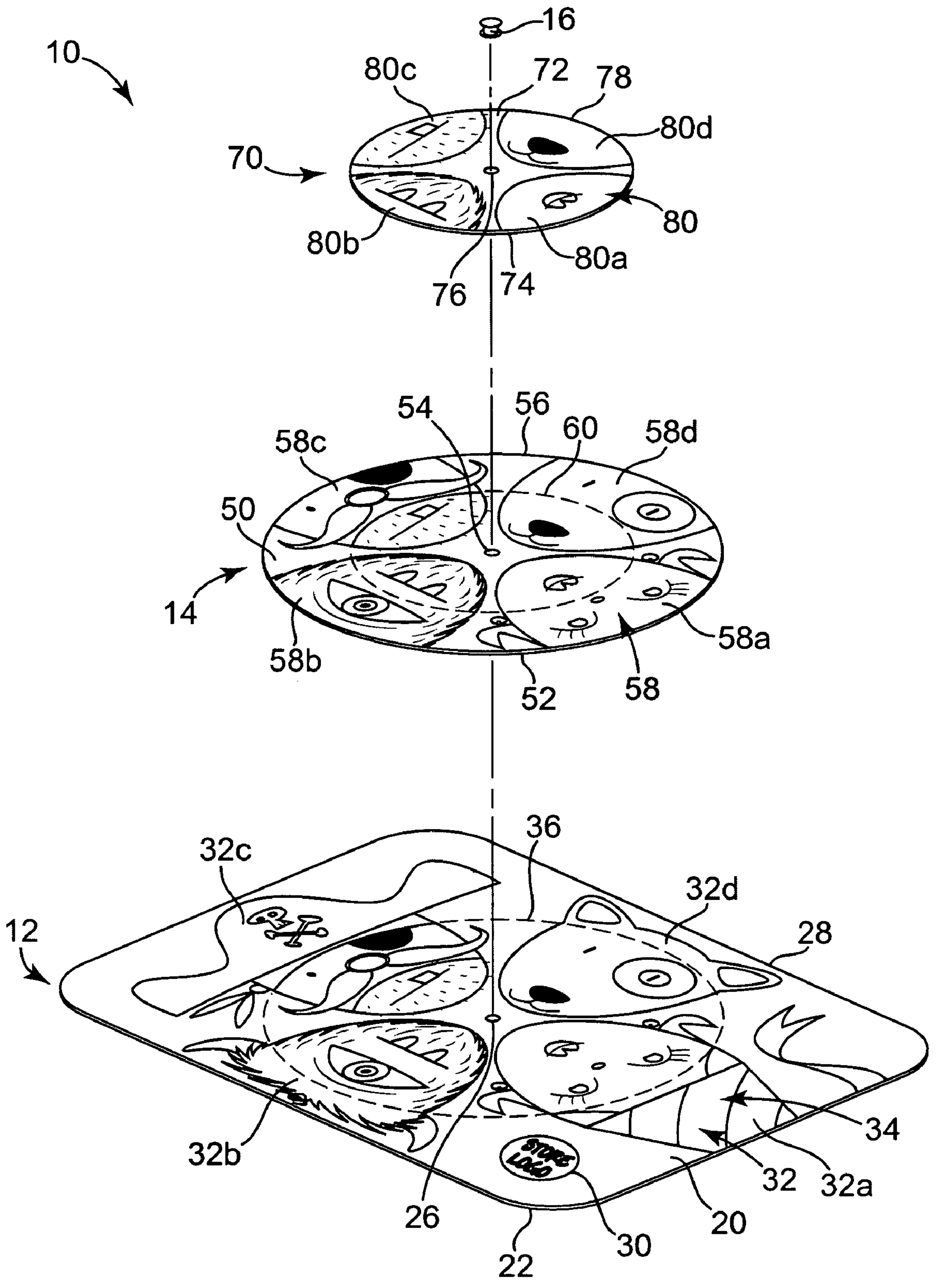
FIG. 1 is an exploded, top perspective view illustrating one embodiment of a stored-value card, according to the present invention.

Turning to the figures, FIG. 1 illustrates an exploded, top perspective view of one embodiment of the stored-value card 10 according to the present invention. The stored-value card 10 includes a first member or base substrate 12, a first auxiliary member 14, and a connection device 16. Base substrate 12 provides overall rigidity to stored-value card 10 and supports first auxiliary member 14. First auxiliary member 14 is movably coupled to base substrate 12 with connection device 16.

Figure 2:
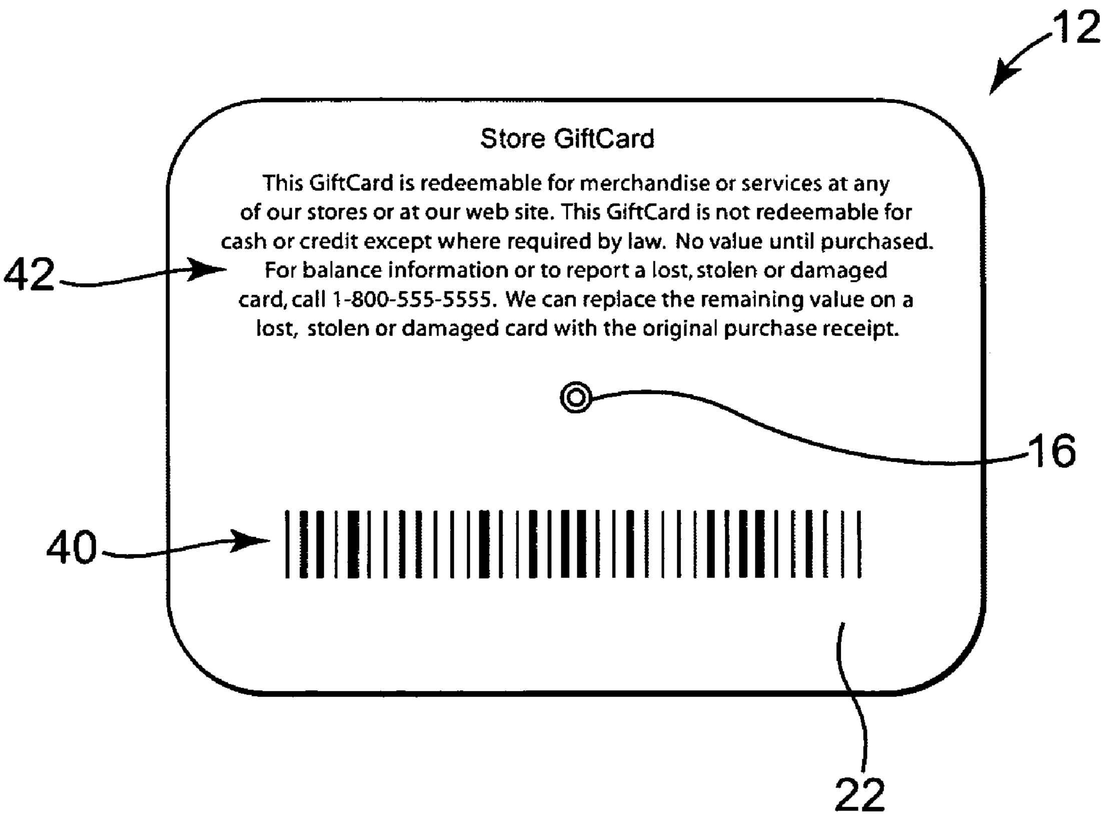
FIG. 2 is a bottom view illustrating one embodiment of the stored-value card of FIG. 1, according to the present invention.

Collectively referring to the embodiment illustrated in FIGS. 1 and 2, base substrate 12 is generally a panel defining a first surface 20 and a second surface 22 opposite the first surface 20. Second surface 22 is substantially planar and in one embodiment, first and second surfaces 20 and 22 are both substantially planar. In one example, an aperture 26 is formed through base substrate 12, for instance, through a center axis of base substrate 12, to facilitate coupling of base substrate 12 to first auxiliary member 14 as will be further described below.

In one embodiment, base substrate 12 is generally rectangular in shape and is of a size similar to that of an identification card, a credit card, or other card sized to fit in a wallet of a card bearer. In particular, in one embodiment, base substrate 12 is about 8.5 cm long, about 5.5 cm wide, and less than about 1 mm thick. In other embodiments, base substrate 12 is otherwise shaped as a square, circle, oval, star, or any other suitable shape defining an outer perimeter 28. Base substrate 12 is formed of a somewhat rigid yet flexible material similar to that commonly used for identification cards, credit cards, etc. More specifically, in one embodiment, base substrate 12 is formed of paper, cardstock, plastic, e.g. polycarbonate, polystyrene, or polyvinyl chloride (PVC), or other suitable material. In one embodiment, base substrate 12 is formed of injected molded plastic or cut from sheet-stock plastic material. Accordingly, base substrate 12 is one example of means for supporting at least first auxiliary member 14.

First surface 20 is configured to receive first auxiliary member 14 and, in one example, includes one or more of indicia 30 and at least a graphic portion or element, for example, a first graphic portion 32, of a graphic or pictorial representation 34. In one embodiment, indicia 30 identify a brand, e.g. a product brand, a store brand, etc., associated with stored-value card 10. In one example, indicia 30 relate to a retailer configured to accept stored-value card 10 as payment for goods and/or services. In one embodiment, first surface 20 is printed with or otherwise includes a background design, seasonal or holiday identifier, media format indicia, and/or other suitable indicia. Indicia 30 on base substrate 12 are one example of means for associating stored-value card 10 with at least one of a product, a brand, a store, a holiday, a season, an occasion, a media format, e.g. characters, logos, scenes, or other illustrations or photographs related to at least one of a movie, television show, book, video game, etc.

Graphic 34 is any character, text, object, design, picture, etc. depicted by stored-value card that can be visually divided into multiple portions and is collectively defined by at least two members of stored-value card 10, for example, by base substrate 12 and first auxiliary member 14. With this in mind, the graphic portion or graphic element, for example, first graphic portion 32, illustrates part of graphic 34. For instance, in the embodiment illustrated in FIGS. 1, 3A, 3B, and 3C, graphic 34 is a head of a character and first graphic portion 32 included on base member 12 is part of the head such as a top portion of the character's head. In particular, in the illustrated embodiment, first graphic portion 32 extends across first surface 20 outside of the circle defined by broken line 36 generally indicated in FIG. 1.

Base substrate 12 may additionally include other portions of graphic 34 such as the remainder of the character's head. In one embodiment, stored-value card 10 depicts a plurality of graphics 34, for example, graphics 34*a*-34*d* generally indicated in FIG. 3A, and base substrate 12 includes two or more first graphic portions 32, for example, the four first graphic portions 32*a*-32*d* illustrated in FIG. 1, each corresponding to one of the plurality of graphics 34. In one embodiment, the plurality of graphics 34 and, therefore, the plurality of first graphic portions 32 are circumferentially spaced from one another.

Second surface 22 of base substrate 12 includes an account identifier 40, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 40 is printed on or otherwise applied to second surface 22 of base substrate 12. Account identifier 40 indicates a financial account or record to which stored-value card 10 is linked. The financial account or record of the monetary balance on stored-value card 10 optionally is maintained on a database, other electronic or manual record-keeping system, or, in the case of "smart" cards for example, on a chip or other electronic device on/in stored-value card 10 itself. Accordingly, by scanning account identifier 40, a financial account or record linked to stored-value card 10 is identified and can subsequently be activated, have amounts debited therefrom, and/or have amounts added thereto. Account identifier 40 is one example of means for associating stored-value card 10 with a financial account or a financial record.

In one embodiment, redemption indicia 42 are included on second surface 22. Redemption indicia 42 indicate that stored-value card 10 is redeemable for the purchase of goods and/or services and that, upon use, a value of the purchased goods and/or services will be deducted from the financial account or record linked to stored-value card 10. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc. In one embodiment, other indicia are also included on second surface 22 including other objects, texts, backgrounds, graphics, etc.

In one embodiment, first auxiliary member 14 is generally a panel defining a first surface 50 and a second surface generally indicated at 52 opposite the first surface 50. One or both of first and second surfaces 50 and 52 are substantially planar. In one example, an aperture 54 is formed through first auxiliary member 14, for instance through a center axis of first auxiliary member 14. As depicted in FIG. 1, first auxiliary member 14 is circular in shape; however, first auxiliary member 14 may be any other suitable shape such as a square, oval, etc. Regardless of shape, first auxiliary member 14 defines an outer perimeter 56, and has an outer dimension that is smaller than an outer dimension of base substrate 12. In one embodiment, first auxiliary member 14 is formed of a somewhat rigid material, for example, paper, cardstock, plastic such as polycarbonate, polystyrene, or polyvinyl chloride, or other suitable material.

First auxiliary member 14, more particularly, first surface 50, includes at least an other graphic portion or graphic element, for example, a second graphic element 58, of graphic 34. For example, as illustrated in FIG. 1, second graphic portion 58 extends from perimeter 56 of first auxiliary member 14 toward center aperture 54. In one example, second graphic portion 58 extends inward (i.e. toward center aperture 54) from perimeter 56 to an area of first auxiliary member 14 generally indicated by broken line 60 of FIG. 1. In the example illustrated in FIG. 1, where graphic 34 is a head of a character, second graphic portion 58 includes the eyes and/or nose of a character. In one embodiment, first auxiliary member 14 includes two or more second graphic portions 58, for example, the four second graphic portions 58*a*-58*d* illustrated in FIGS. 1 and 3A. In one example, each of the four second graphic portions 58*a*-58*d* corresponds with one of graphics 34*a*-34*d*. Each of the plurality of second graphic portions 58 is circumferentially spaced from the others.

In one embodiment, stored-value card 10 only includes one auxiliary member (i.e., first auxiliary member 14). However, in other embodiments, such as the embodiment illustrated in FIGS. 1, 3A, 3B, and 3C, stored-value card 10 includes two or more auxiliary members including first auxiliary member 14 and second auxiliary member 70. In one embodiment, second auxiliary member 70 is a panel defining a first surface 72 and a second surface generally indicated at 74 opposite the first surface 72. One or both of first and second surfaces 72 and 74 are substantially planar. Second auxiliary member 70 is formed of a somewhat rigid material, for example paper, cardstock, plastic such as polycarbonate, polystyrene, or polyvinyl chloride, or other suitable material.

As depicted in FIG. 1, second auxiliary member 70 is substantially circular in shape; however, second auxiliary member 70 may be any other suitable shape such as a square, star, etc. In one embodiment, regardless of shape, second auxiliary member 70 defines an outside perimeter 78 and has an outer dimension smaller than the outer dimension of first auxiliary member 14. In one example, an aperture 76 is formed through second auxiliary member 70, for instance through a center axis of second auxiliary member 70.

Second auxiliary member 70, more particularly, first surface 72, includes at least yet another graphic portion or graphic element, for example, a third graphic portion 80 of graphic 34. For example, as illustrated in FIG. 1, third graphic portion 80 extends from outer perimeter 78 of second auxiliary member 70 toward center aperture 76. For instance, in the example illustrated in FIG. 1, where graphic 34 is the head of a character, third graphic portion 80 includes the mouth of character. In one embodiment, second auxiliary member 70 includes two or more third graphic portions 80, such as the four third graphic portions 80*a*-80*d* illustrated in FIGS. 1, 3A, 3B, and 3C. Each of the third graphic portions 80 are circumferentially spaced from one another. In one example, each of third graphic portions 80*a*-80*d* is part of a different one of graphics 34*a*-34*d*, respectively. Additional auxiliary members may be added in a manner like that described for auxiliary members 14 and 70 such that the graphic 34 is divided into a plurality of graphic portions as desired.

During assembly, base substrate 12, first auxiliary member 14, and second auxiliary member 70 (if included) are sequentially stacked on one another. More specifically, first surface 20 of base substrate 12 is positioned to interface with second surface 52 of first auxiliary member 14, and first surface 50 of first auxiliary member 14 is positioned to interface with second surface 74 of second auxiliary member 70. When stacked, apertures 26, 54, and 76 align with one another, such that base substrate 12 and auxiliary members 14 and 70 are coaxially positioned. Notably, first auxiliary member 14 has a smaller outer dimension than base substrate 12, and second auxiliary member 70 has a smaller outer dimension than first auxiliary member 14. As a result, once stacked, a portion of first surface 20 of base substrate 12 and a portion of first surface 50 of first auxiliary member 14 are still visible. More specifically, first graphic portion 32 on first surface 20 and second graphic portion 58 on first surface 50 are visible upon assembly.

Once positioned, base substrate 12 and auxiliary members 14 and 70 are rotatably coupled to one another by a rivet or other suitable connection device 16. For example, device 16 is placed through apertures 26, 54, and 76 and is secured. In this manner, base substrate 12, first auxiliary member 14, and second auxiliary member 16 are all rotatable relative to one another. Accordingly, device 16 is one example of means for movably coupling base substrate 12 and auxiliary members 14 and 70 to one another.

Figure 3A:
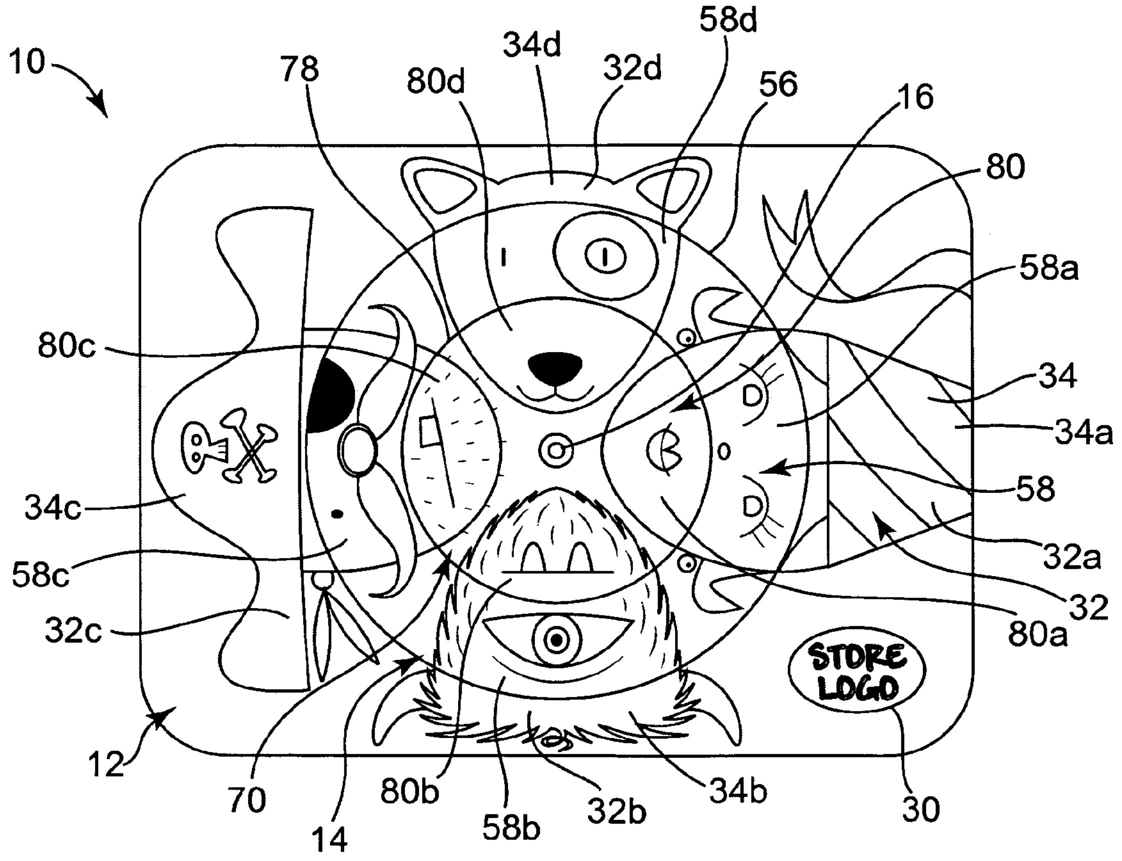
FIG. 3A is a top view illustrating one embodiment of the stored-value card of FIG. 1 in a first position, according to the present invention.
Figure 3B:
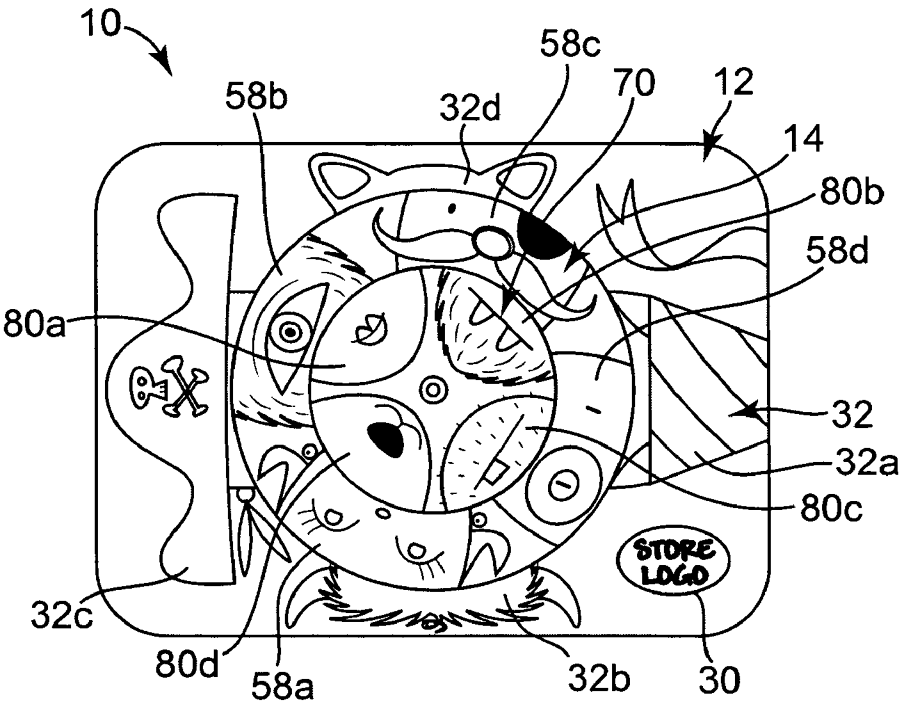
FIG. 3B is a top view illustrating the stored-value card of FIG. 3A in a second position.

In one embodiment, base substrate 12 and auxiliary members 14 and 70 are placed in a first position as illustrated in FIG. 3A where each of first graphic portion 32, second graphic portion 58, and third graphic portion 80 are aligned with one another to collectively present graphic 34 in a coherent manner. For example, graphic portions 32, 58 and 80 collectively present graphic 34 as a character head such as a head of a princess, monster, pirate, or dog as illustrated in FIG. 3A. Rotation of any one of base substrate 12 and auxiliary members 14 and 70 misaligns and destroys the coherent alignment of graphic portions 32, 58, and 80 such that the appearance of graphic 34 is disjointed as illustrated in FIG. 3B. In one example, continued rotation of one of base substrate 12 and auxiliary members 14 and 70 eventually realigns graphic portions 32, 58, and 80.

Figure 3C:
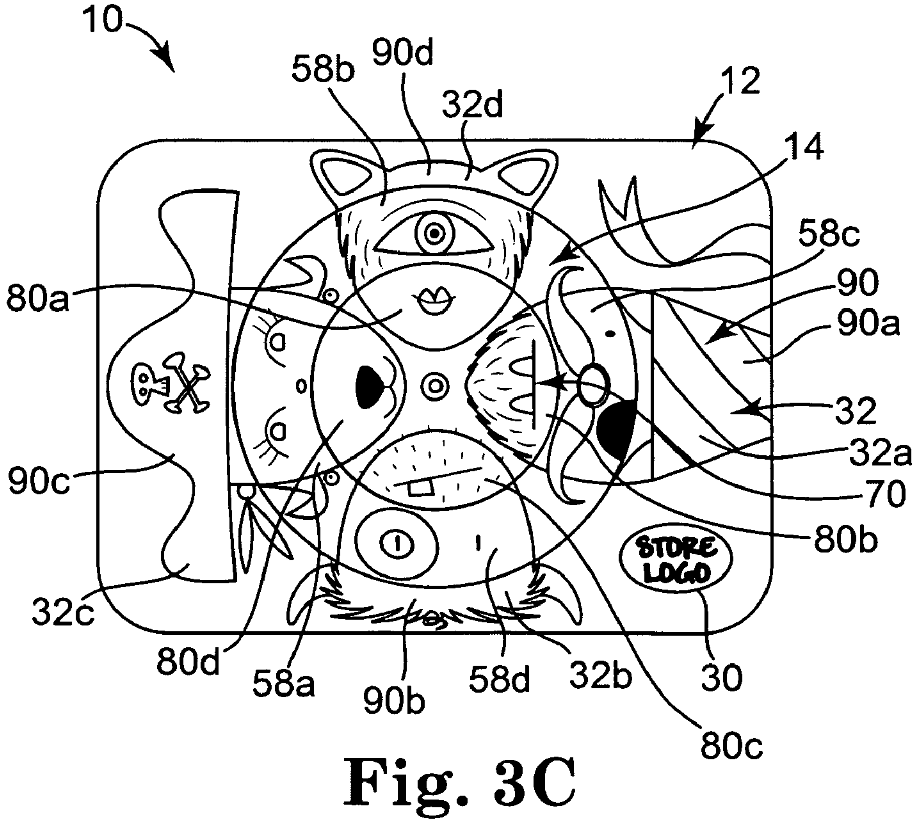
FIG. 3C is a top view illustrating the stored-value card of FIG. 3A in a third position.

In one embodiment, in which a plurality of graphics 34 such as graphics 34*a*-34*d* are included, rotation of one of base substrate 12 and/or auxiliary member(s) 12 and/or 70 aligns one or more portions of one of graphics 34*a*-34*d* with a different portion of one of the other graphics 34*a*-34*d* to depict new blended graphics or pictorial representations 90 (i.e. graphics each including portions originally from two or more of the graphics 34*a*-34*d*) such as the four blended graphics 90*a*-90*d* illustrated in FIG. 3C. More particularly, in the illustrated embodiment, auxiliary layers 14 and 70 are rotated such that first graphic portion 32*a* aligns with second graphic portion 58*c* and third graphic portion 80*b* to present one of new blended graphics 90 (i.e., blended graphic 90*a*). For example, where graphic 34*a* is a princess, graphic 34*b* is a monster, graphic 34*c* is a pirate, and graphic 34*d* is a dog, rotation of auxiliary member(s) 14 and/or 70, blends different graphic portions 32, 58, and 80 to form new blended graphics 90 including a blended graphic 90*a* having the hat of the princess (first graphic portion 32*a*), the eyes and nose of the pirate (second graphic portion 58*c*), and the chin and teeth of the monster (third graphic portion 80*b*).

In this manner, it should be noted that each of first graphic portions 32 are configured with similar aspect ratios such that different graphic portions 32, 58, and 80 from different graphics 34 will align with one another upon rotation. For instance, each graphic 34 defines a head having similar overall width dimension and feature placement such that the resultant blended graphic 90 appears as a continuous, albeit strange in some circumstances, head. In one embodiment, common features to each of graphics 34 are positioned similarly in each graphic. For instance, all eyes are placed a similar radial distance away from the center of stored-value card 10, etc. In this way, rotating auxiliary members 14 and 70 replaces features of graphics 34 with like features (e.g., eyes with eyes, mouths with mouths, etc.). By positioning and spacing graphics 34 consistently and by placing corresponding features in similar positions for each graphic 34, the graphic portions 32, 58, and 80 from different graphics 34 are interchangeable.

Although described and illustrated as having the same number of each graphic portion 32, 58, and 80, it should be understood that in one embodiment, only one of a graphic portion 32, 58, or 80 is included on stored-value card 10 while a plurality of other graphic portions 32, 58, and/or 80 are included. For instance, only one first graphic portion 32 may be included whereas a plurality of second and third graphic portions 58 and 80 are included such that the blended graphics 90 all include the same first graphic portion 32, but any one of the plurality of second and third graphic portions 58 and 80. In this manner, second and third graphic portions 58 and 80 remain interchangeable.

While illustrated as being a head, graphics 34 can be any suitable graphic as described above. For instance, in one example, the first graphic portion 32 may be a first word selection, the second graphic portion may be a second word selection, and the third graphic portion may be a third word selection such that when the graphic portions are aligned, graphic 34 or blended graphic 90 is in the form of a phrase. In one embodiment, base substrate 12 does not depict a portion of graphic 34 and, as such, only auxiliary members 14 and 70 depict interchangeable graphic portions 58 and 80.

Figure 4A:
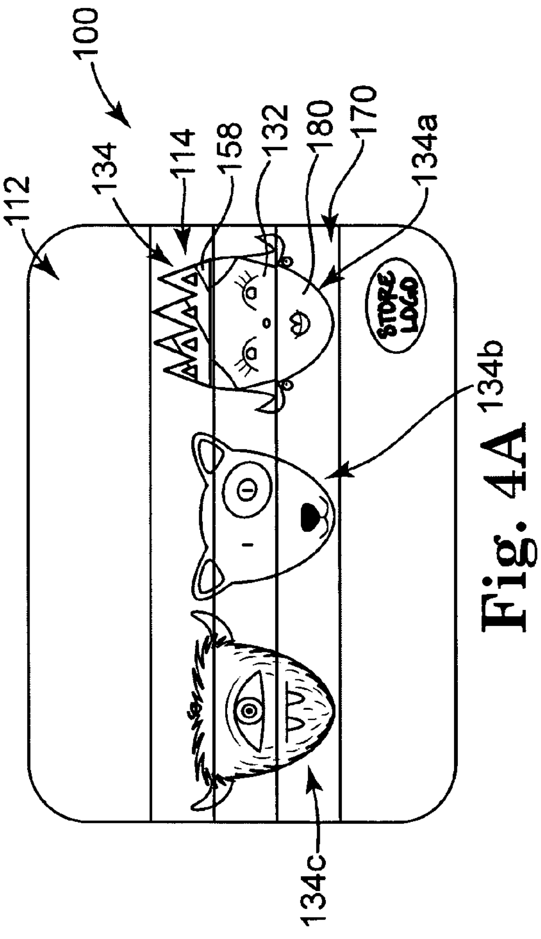
FIG. 4A is a top view illustrating one embodiment of a stored-value card in a first position, according to the present invention.
Figure 4B:
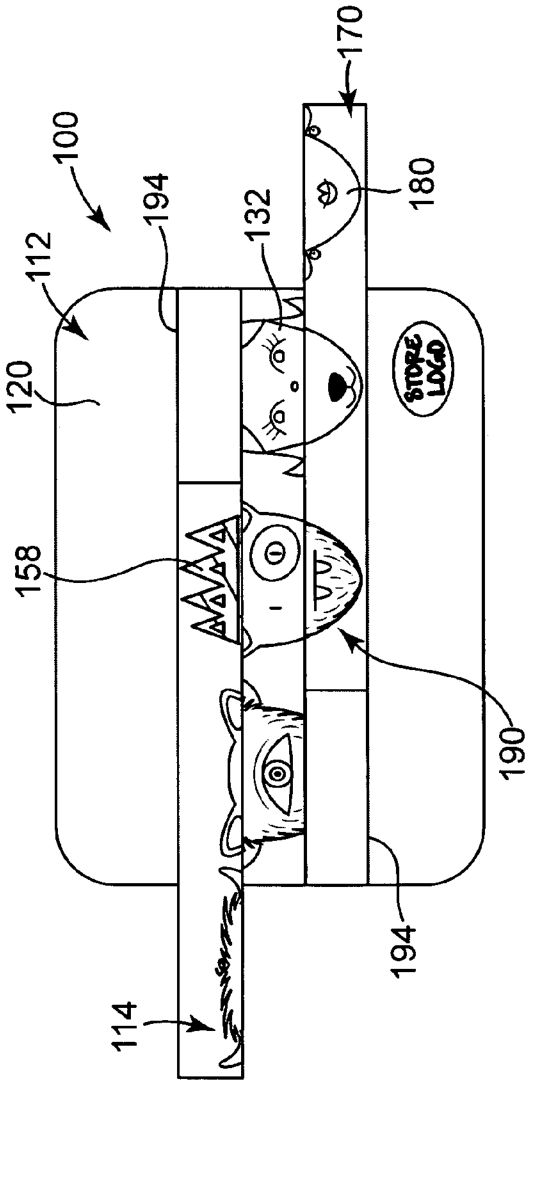
FIG. 4B is a top view illustrating the stored-value card of FIG. 4A in a second position.

Referring FIGS. 4A and 4B, another embodiment of a stored-value card, more particularly, stored-value card 100, is similar to stored-value card 10 except where specifically enumerated herein. Stored-value card 100 defines a base substrate 112, at least a first auxiliary member 114, and optionally, a second auxiliary member 170. Base substrate 112 defines a first surface 120 opposite a second surface (not illustrated) similar to second surface 22 of stored-value card 10 (FIG. 1). Rather than being rotatably coupled to one another, auxiliary members 114 and 170 are slidably coupled with base substrate 112 via tracks, rails, grooves, or any other suitable construction 194 of base substrate 112. With this construction, one or more graphics 134 (e.g., graphics 134*a*-134*c*) are illustrated in a linear array on stored-value card 100, with a graphic portion such as first graphic portion 132 of each graphic 134 being illustrated on base substrate 112, an other graphic portion such as a second graphic portion 158 of each graphic 134 being illustrated on first auxiliary member 114, and yet another graphic portion such as a third graphic portion 180 of each graphic 134 being illustrated on second auxiliary member 170. Sliding auxiliary members 114 and 170 relative to base substrate 112 transitions stored-value card 10 from initially depicting one or more coherent graphics 134, as illustrated in FIG. 4A, to depicting one or more blended graphics 190, as depicted in FIG. 4B.

Figure 5A:
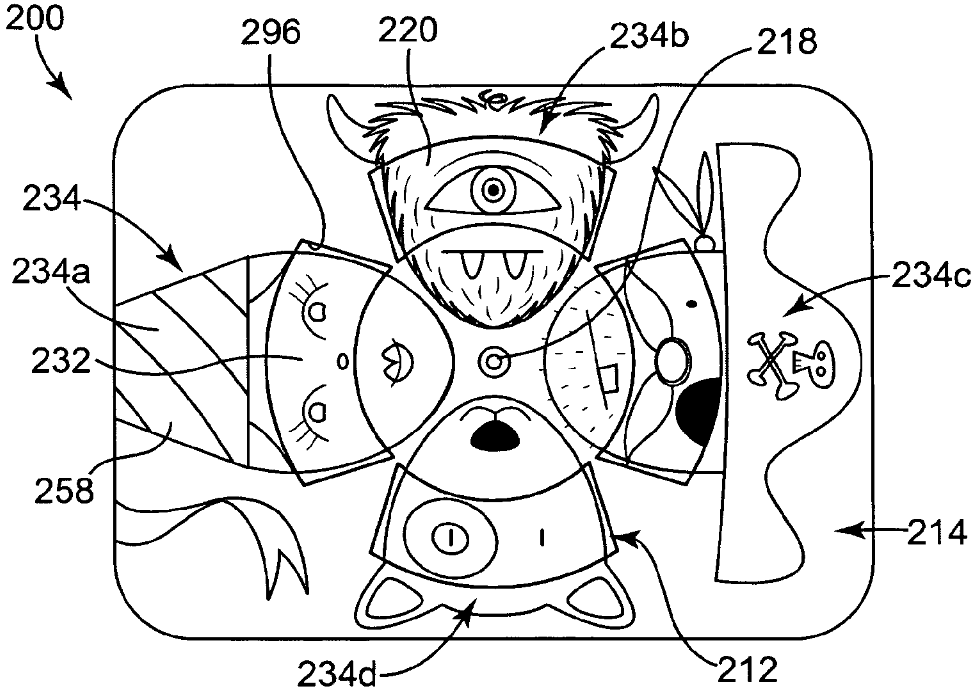
FIG. 5A is a top view illustrating one embodiment of a stored-value card in a first position, according to the present invention.
Figure 5B:
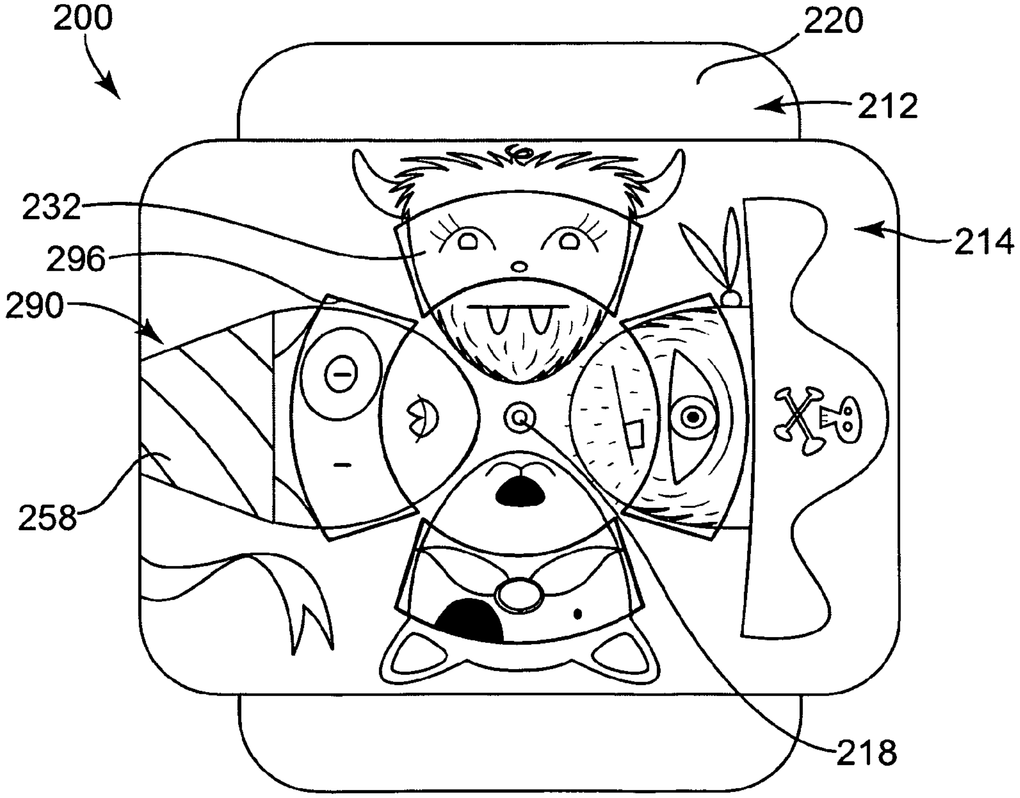
FIG. 5B is a top view illustrating the stored-value card of FIG. 5A in a second position.

FIGS. 5A and 5B illustrate one embodiment of stored-value card 200 including a base substrate 212 and an auxiliary member 214. Base substrate 212 includes a first surface 220 and a second surface (not shown), which is similar to second surface 22 of stored-value card 10 (FIG. 2). In this embodiment, a plurality of graphics 234, more specifically, graphics 234*a*-234*d*, are included on stored-value card 200 circumferentially spaced from one another. Graphic portions such as first graphic portions 232 are included on first surface 220 and are circumferentially spaced from one another. Each of first graphic portions 232 are positioned a similar radial distance away from center axis 218. In one instance, where graphics 234 are character heads, each of first graphic portions 232 is a different depiction of character eyes.

Auxiliary member 214 is concentrically positioned with and rotatably coupled to base substrate 212. In one embodiment, auxiliary member 214 is sized similar to base substrate 212. Auxiliary member 214 includes one or more graphic portions such as second graphic portions 258 including the remainder of graphic 234 not included in first graphic portion 232. Each second graphic portion 258 is circumferentially spaced from one another and generally positioned a similar distance from center axis 218. An aperture or window 296 is formed by auxiliary member 214 through or adjacent to one or more of the second graphic portions 258 included thereon. Each window 296 is spaced circumferentially from the other windows 296, and each window 296 is positioned a similar radial distance away from center axis 218.

More specifically, each window 296 is positioned on auxiliary member 214 to correspond with a position of one of first graphic portions 232 on base substrate 212 upon assembly. In one example, each window 296 and first graphic portion 232 is spaced a similar radial distance away from center axis 218 upon assembly. As such, when auxiliary member 214 is rotatably and coaxially assembled to base substrate 212, in a first position as illustrated in FIG. 5A, one or more of first graphic portions 232 are each visible through a corresponding window 296. In this manner, first graphic portion 232 of base substrate 212 and second graphic portion 234 of auxiliary member 214 collectively define at least one coherent graphic 234 as illustrated in FIG. 5A. Upon rotation of auxiliary member 214 relative to base substrate 212, first graphic portions 232 rotate relative to second graphic portions 258. As illustrated in FIG. 5B, such rotation eventually aligns second graphic portions 258 with the different first graphic portions 232 such that the different first graphic portions 232 are viewable through windows 296. The second position illustrated in FIG. 5B, accordingly, defines one or more blended graphics 290 (i.e. second graphics including different portions of various first or originally formed graphics). Although described as included a plurality of graphics 234, first graphic portions 232, second graphic portions 258, and windows 296, in one embodiment, only one of any of components 234, 232, 258, and 296 may be included to achieve a desired visual or amusing effect.

Figure 6A:
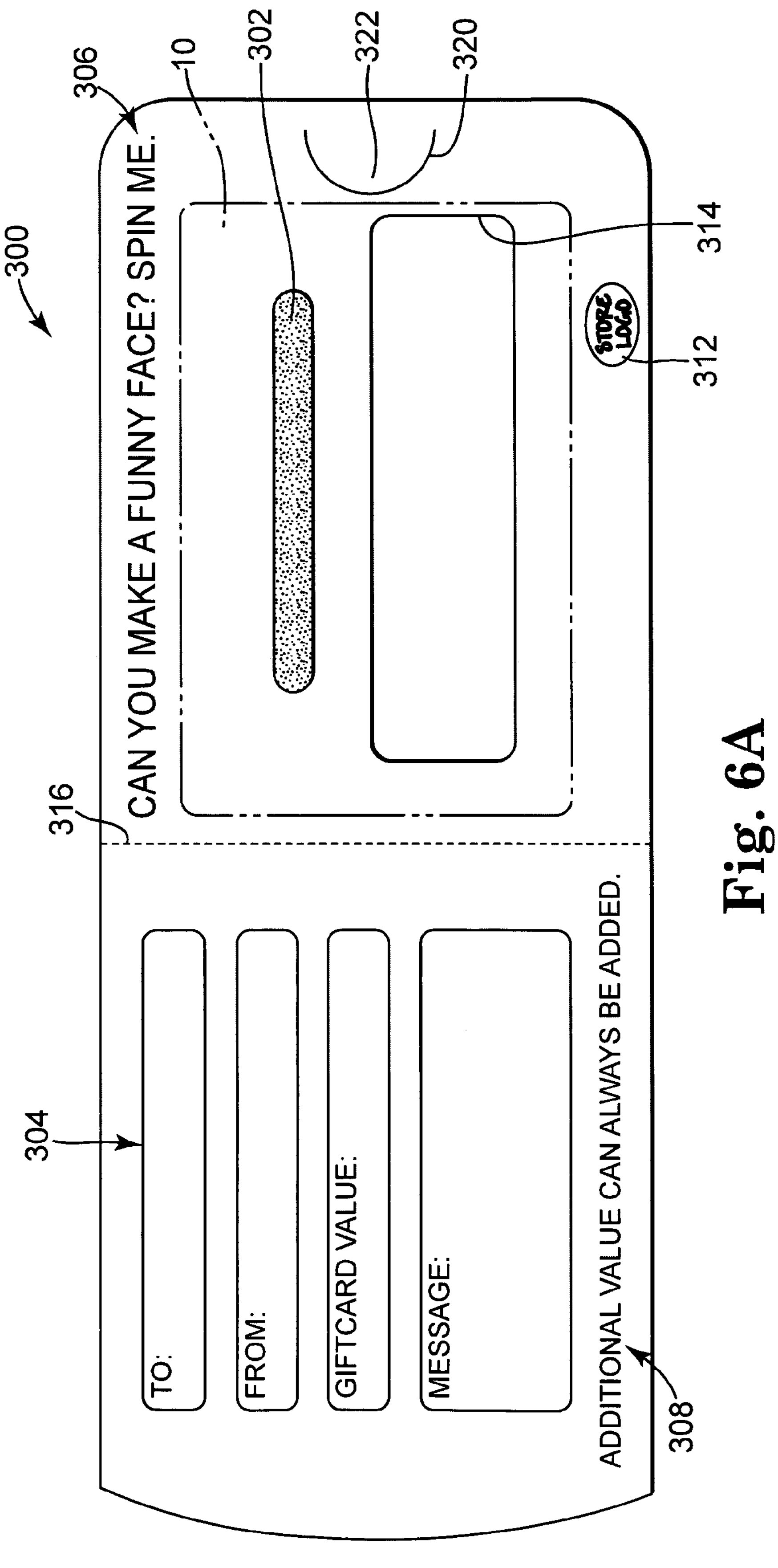
FIG. 6A is a top view illustrating one embodiment of an unfolded backer for a stored-value card assembly, according to the present invention.
Figure 6B:
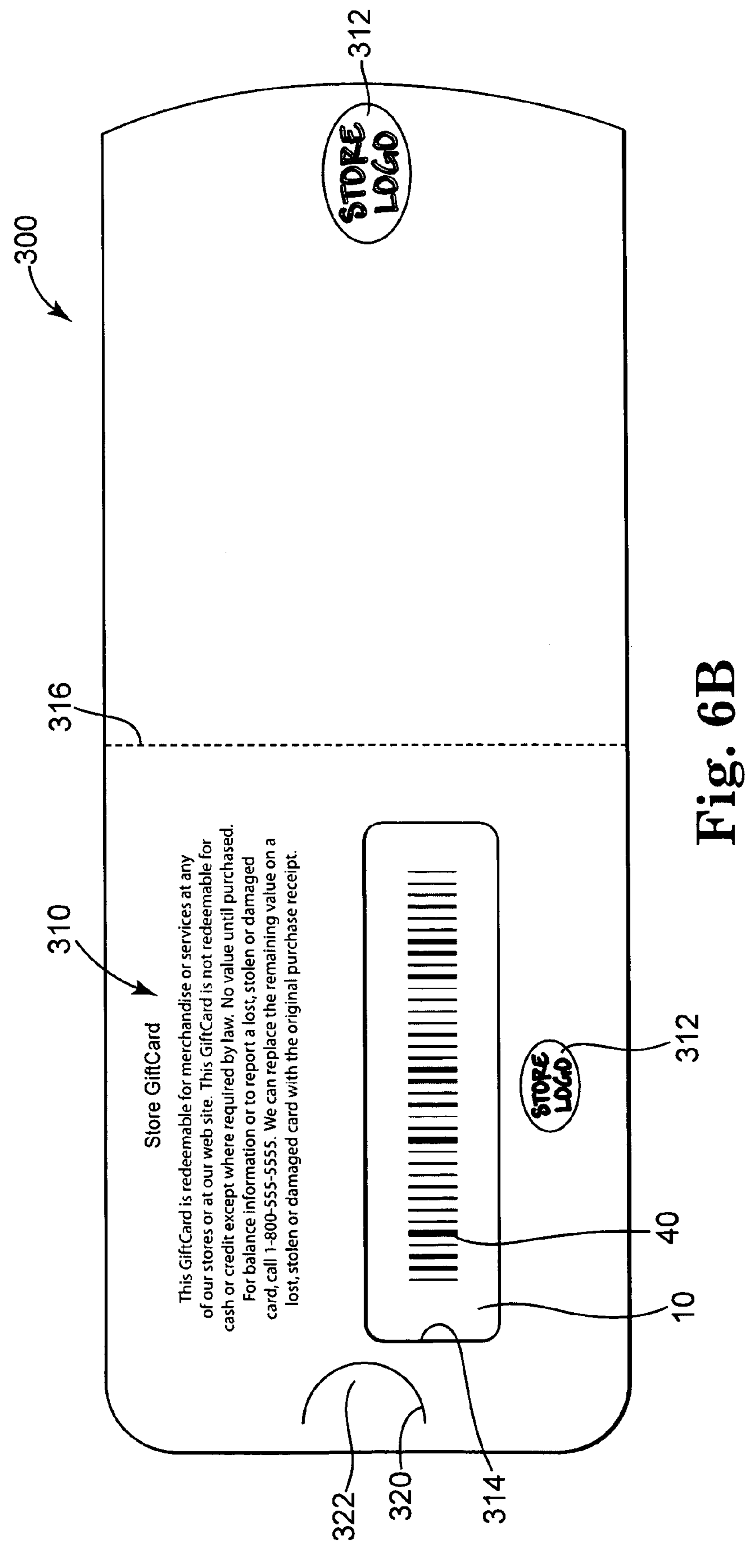
FIG. 6B is a bottom view illustrating the unfolded backer of FIG. 6A.

FIGS. 6A and 6B illustrate a carrier or backer 300 for supporting stored-value card 10. Although backer 300 is described herein with reference to stored-value card 10, it should be understood that backer 300 can similarly be used with other stored-value cards such as stored-value cards 100 and 200. Stored-value card 10, which is represented in phantom lines in FIG. 6A, is readily releasably attached to backer 300, for example by an adhesive 302 or the like. Backer 300 comprises a single layer or multiple layers of paper or plastic material, for example, generally in the form of a relatively stiff but bendable/flexible card. Use of other materials is also contemplated. Backer 300 displays indicia, graphics or text information including store logo(s), store name(s), slogans, advertising, instructions, directions, brand indicia, promotional information, holiday indicia, seasonal indicia, media format identifiers, characters, and/or other information.

Indicia 304 for example include to, from, initial gift card value, and message fields. Indicia 306 promote that portions of stored-value card 10 are moveable to create blended graphics 90 (FIG. 3C). In particular, in one example where graphic 34 is a character head, indicia 306 state "Can you make a fumy face? Spin me." Indicia 308 notify a user and promote that additional value can always be added to or reloaded to base substrate 12.

Referring to FIG. 6B, indicia 310 indicate that stored-value card 10 is redeemable for the purchase of goods and/or services and that upon use, a value of the purchased goods and/or services will be deducted from the financial account or record linked to stored-value card 10. In one embodiment, indicia 310 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc. Brand indicia 312 identify a store, brand, department, etc. and/or services associated with base substrate 12. Any of indicia 304, 306, 308, 310, 312, or other indicia optionally may appear anywhere on backer 300 or stored-value card 10. Additional information besides that specifically described and illustrated herein may also be included.

Backer 300 includes a window or opening 314 for displaying account identifier 40 of base substrate 12 as illustrated in FIG. 6B. As previously described, account identifier 40 is adapted for accessing a financial account or a financial record associated with base substrate 12 for activating, loading, or debiting from the financial account or financial record. Accordingly, window 314 allows access to account identifier 40 to activate and/or load stored-value card 10 without removing stored-value card 10 from backer 300. In one embodiment, a portion of backer 300 alternatively is configured to be folded away from the remainder of backer 300 to access account identifier 40 without removing stored-value card 10 from backer 300.

In one embodiment, backer 300 is a bi-fold substrate defining a fold line 316, about which backer 300 is foldable roughly in half. In FIGS. 6A and 6B, backer 300 is unfolded, i.e. is in an open configuration. According to one embodiment, FIG. 6A illustrates surfaces of backer 300 that will be supported on a rack or other fixture to be visible to a consumer of a retail store who is considering the purchase of stored-value card 10. In another example, while on display in a retail store, backer 300 is folded back about fold line 316 to present only the surfaces of backer 300 illustrated in FIG. 6A that are positioned on the same side of fold line 316 as stored-value card 10 to a consumer. In such an embodiment, indicia 304 and 308 would not be visible to a consumer when backer 300 and stored-value card 10 are placed for display in a retail store. Backer 300 is one example of means for supporting stored-value card 10 for display in a retail setting.

After purchase, backer 300 is foldable about fold line 316 such that the FIG. 6A surfaces of backer 300 are folded toward each other and stored-value card 10 is enclosed in a compact package formed by foldable backer 300. In this manner, the surfaces of backer 300 illustrated in FIG. 6B are disposed toward the outside of the folded, compact package, according to embodiments of the invention. In one embodiment, folded backer 300 effectively wraps stored-value card 10 for presentation from a consumer to a recipient. Folding on the other direction about fold line 316 for display on a rack in a retail setting, or about other fold lines of backer 300 is also contemplated.

In one embodiment, a substantially semi-circular cut 320 is formed through backer 300 near an edge of backer 300 spaced from and substantially parallel to fold line 316. Semi-circular cut 320 extends partially toward fold line 316 and defines a substantially semi-circular flap 322, which can be partially bent away from the remainder of backer 300. More specifically, upon folding of backer 300 about fold line 316, to close backer 300, an opposing edge of backer 300 is tucked beneath flap 322 to maintain backer 300 in a folded or closed position. Other backers similar to backer 300 can be used with various sizes and shapes of stored-value card 10. Other backers or packages are also contemplated for supporting stored-value card 10.

Figure 7:
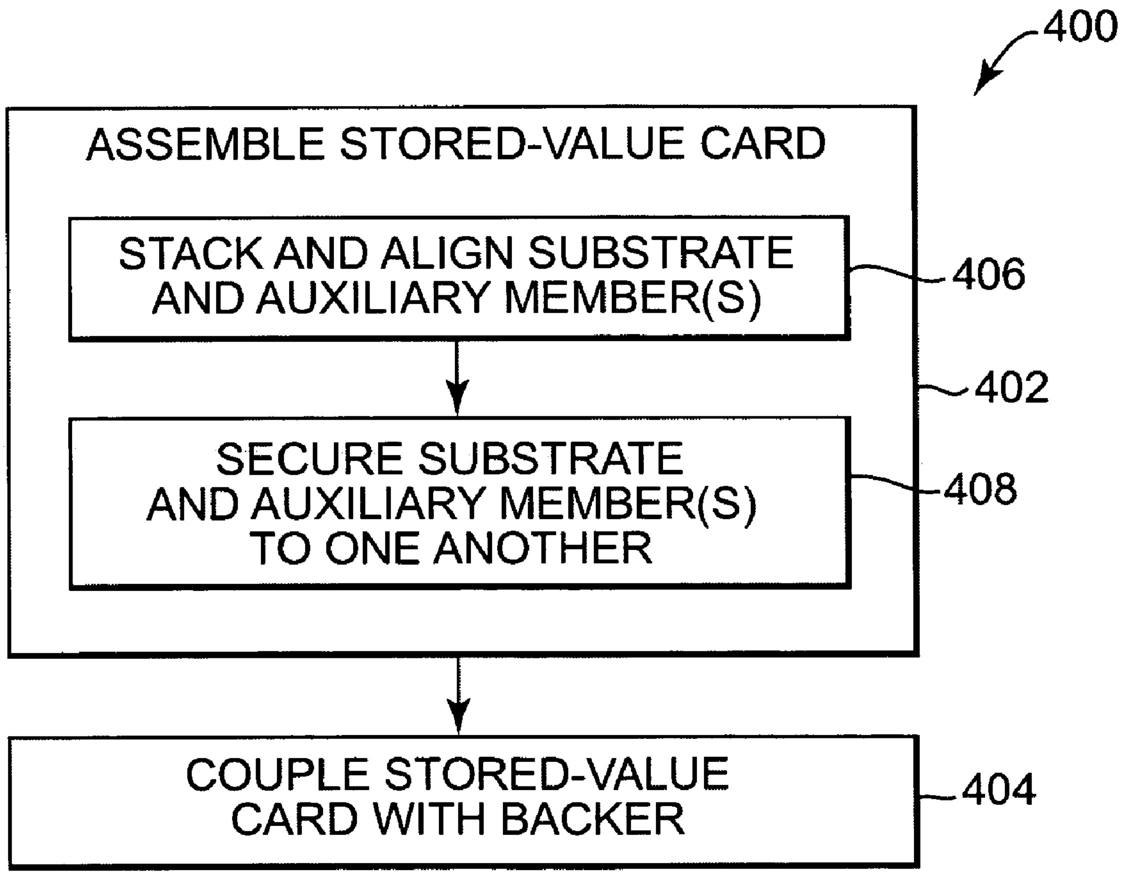
FIG. 7 is a flow chart illustrating one embodiment of a method of assembling a stored-value card assembly, according to the present invention.

FIG. 7 is a flow chart illustrating one embodiment of a method 400 of assembling a stored-value card and is described with particular reference to stored-value card 10 and FIG. 1. Although stored-value card 10 is primarily referenced in the flow charts of FIGS. 7, 8, and 9, other stored-value cards including stored-value cards 100 (FIGS. 4A and 4B) and 200 (FIGS. 5A and 5B) may be substituted for stored-value card 10. At 402, stored-value card 10 is assembled and, at 404, stored-value card 10 is coupled with backer 300 (illustrated in FIGS. 6A and 6B). In particular, in one embodiment, assembling stored-value card 10 at 402 includes stacking and aligning base substrate 12 and auxiliary member(s) 14 and/or 70 at 406 and movably securing base substrate and auxiliary member(s) 14 and/or 70 with device 16 at 408 as described above.

At 404, the assembled stored-value card 10 is coupled with backer 300 (FIGS. 6A and 6B) to form a retail product. In one example, stored-value card 10 is coupled to backer 300 with an adhesive or other selectively releasable material or device. In one embodiment, backer 300 is folded into a folded position for shipment and/or display to retail settings. Backer 300 is, more specifically, folded by folding backer 300 about fold line 316 such that the backer surfaces illustrated in FIG. 6B are moved toward each other. As such, a portion of backer 300 with stored-value card 10 is visible from one side of folded backer 300. Backer 300 can also be folded in the opposite direction about fold line 316 to substantially enclose stored-value card 10. In one embodiment, backer 300 is displayed in an unfolded position hung from a support arm within the retail setting.

Figure 8:
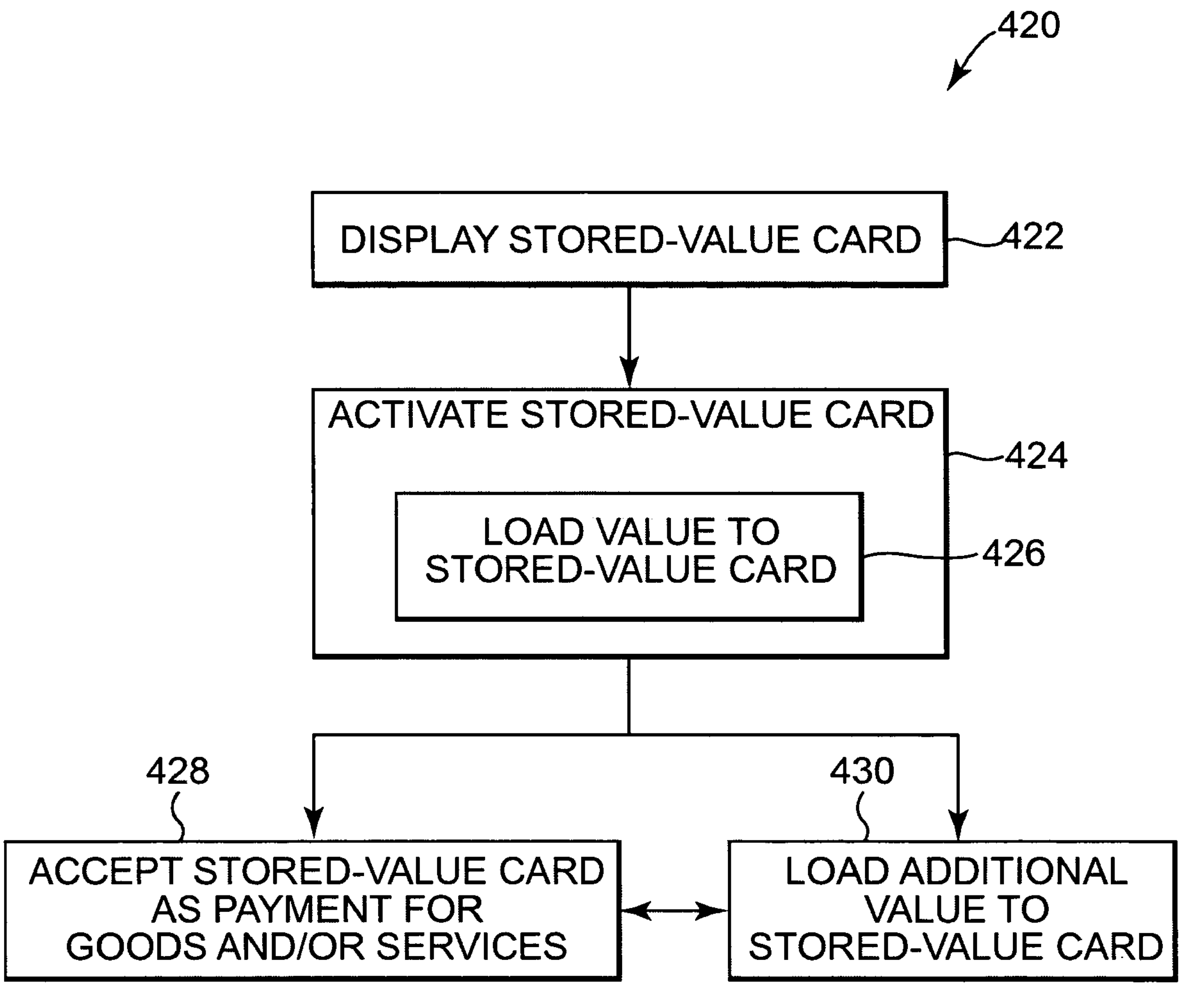
FIG. 8 is a flow chart illustrating one embodiment of a method of encouraging purchase and facilitating use of a stored-value card assembly, according to the present invention.

FIG. 8 is a flow chart illustrating one embodiment of a method 420 of providing stored-value card 10 for sale and use by consumers. At 422, stored-value card 10 is placed or hung from a rack, shelf, or other similar device to display stored-value card 10 for sale to potential consumers. In one example, stored-value card 10 is placed for retail sale when assembled to backer 300. In one embodiment, a depiction of stored-value card 10 is placed on website for viewing and purchase by potential consumers. In one embodiment, stored-value card 10 is displayed without backer 300.

At 424, a consumer who has decided to purchase stored-value card 10 presents the stored-value card 10 on backer 300 to a retail store employee, retail store kiosk, or other person or device to scan account identifier 40 at base substrate 12 to access a financial account or financial record linked to account identifier 40. In particular, account identifier 40 is scanned or otherwise accessed through window 314 of backer 300. Upon accessing the financial account or financial record, at 426, value is added to the financial account or financial record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website.

At 428, the retail store or other affiliated retail setting or website accepts base substrate 12 as payment towards the purchase of goods and/or services made by the current bearer of stored-value card 10. In particular, the value currently loaded on stored-value card 10 is applied towards the purchase of goods and/or services. At 430, additional value is optionally loaded on stored-value card 10 at a point of sale terminal, kiosk, or other area of the retail store or related setting. Upon accepting stored-value card 10 as payment at 428, the retail store or related setting can subsequently perform either operation 428 or operation 430 as requested by a current bearer of stored-value card 10. Similarly, upon loading additional value on stored-value card 10 at 430, the retail store or related setting can subsequently perform either operation 430 again or operation 428. In one example, the ability to accept stored-value card 10 as payments for goods and/or services is limited by whether the financial account or financial record associated with stored-value card 10 has any value at the time of redemption.

Figure 9:
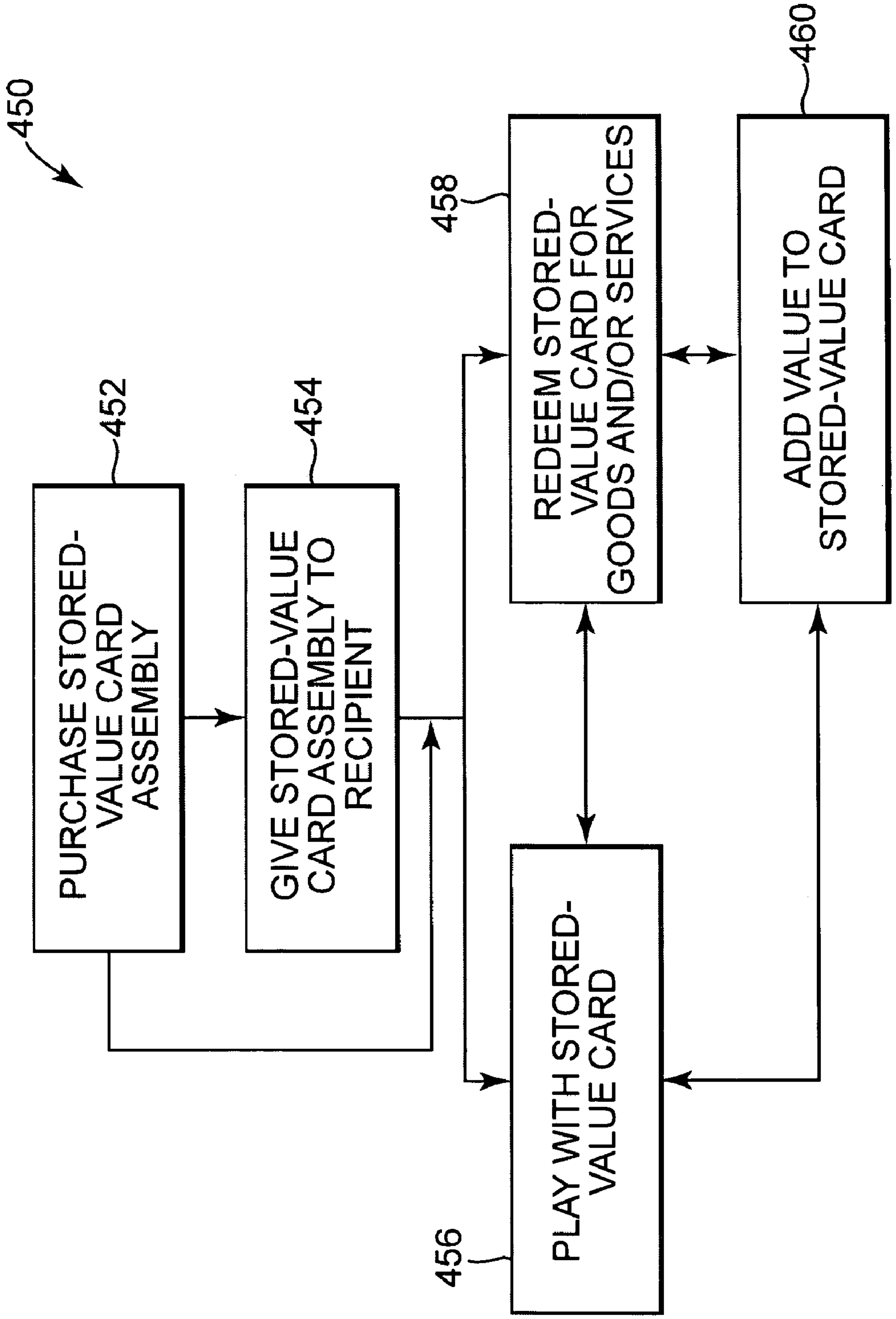
FIG. 9 is a flow chart illustrating one embodiment of a method of using a stored-value card assembly, according to the present invention.

FIG. 9 is a flow chart illustrating one embodiment of a method 450 of using stored-value card 10 (FIG. 1). At 452, a potential consumer of stored-value card 10, which is displayed in a retail store or viewed on a website, decides to and does purchase stored-value card 10 from a retail store or website setting. Stored-value card 10 can be displayed and purchased alone or as part of a retail product along with backer 300 (FIGS. 6A and 6B). Upon purchasing a stored-value card 10, a retail store employee, a retail store kiosk, or other person or device scans account identifier 40 through wrapper 16 and/or window 314 of backer 300. Upon scanning account identifier 40, the financial account or record linked to account identifier 40 is accessed and activated to load value onto stored-value card 10.

At 454, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use.

At 456, the consumer or recipient, whoever is in current ownership or otherwise is the current bearer of stored-value card 10, removes stored-value card 10 from backer 300 if stored-value card 10 is coupled with backer 300. The current bearer of stored-value card 10 can play with the stored-value card by manipulating base substrate 12 and/or auxiliary members 14 and 70 to vary the visual presentation of graphic(s) 34 or 90. As such, the bearer is amused by stored-value card 10.

At 458, the current bearer of stored-value card 10 redeems stored-value card 10 for goods and/or services from the retail store or website. At 460, the current bearer of stored-value card 10 optionally adds value to stored-value card 10, and more particularly, to the financial account or financial record associated with stored-value card 10, at the retail store or over the Internet. Upon playing with stored-value card 10 at 456, redeeming stored-value card 10 at 458, or adding value to stored-value card 10 at 460, the current bearer of stored-value card 10 subsequently can perform any of operations 456, 458, or 460 as desired. In one embodiment, the ability of the current bearer to repeat redeeming stored-value card 10 at 458 is limited by whether the financial account or financial record associated with stored-value card 10 has any remaining value at the time of attempted redemption.

Although described above as occurring at a single retail store or website, in one embodiment, purchasing stored-value card 10 at 452, redeeming stored-value card 10 at 458, and adding value to stored-value card 10 at 460, can each be performed at any one of a number of stores adapted to accept stored-value card 10 or over the Internet. In one example, a number of stores are each part of a chain or similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. For example, other stored-value card structures including movable graphic portions may be used. Other modifications within the scope of the invention and its various embodiments will be apparent to those of ordinary skill.

What is claimed is:

1. A stored-value card comprising:

a base substrate including an account identifier linking the stored-value card to at least one of a financial account or a financial record; and an auxiliary member movably coupled to the base substrate and including a first graphic portion;

wherein the auxiliary member is movable between a first position relative to the base substrate, in which the first graphic portion partially defines a first graphic, and at least a second position, in which the first graphic portion partially defines a second graphic different from the first graphic.

2. The stored-value card of claim 1, wherein a second graphic portion is included on the base substrate such that when the auxiliary member is in the first position, the first graphic portion and the second graphic portion align with each other, and when the auxiliary member is in the second position, the first graphic portion and the second graphic portion are misaligned.

3. The stored-value card of claim 2, wherein the first graphic is a head of a character, the first graphic portion includes one of an eye and a mouth of the character, and the second graphic portion includes the other of the eye and the mouth of the character.

4. The stored-value card of claim 2, wherein the auxiliary member is a first auxiliary member, the stored-value card further comprising a second auxiliary member movably coupled to the base substrate and including a third graphic portion, the second auxiliary member being movable between an initial position, in which the third graphic portion aligns with at least one of the first graphic portion and the second graphic portion, and at least a subsequent position, in which the third graphic portion, the first graphic portion, and the second graphic portion are misaligned with one another.

5. The stored-value card of claim 4, wherein the base substrate the first auxiliary member, and the second auxiliary member are coaxially positioned and rotatably coupled to one another.

6. The stored-value card of claim 4, wherein the first auxiliary member is interposed between the base substrate and the second auxiliary member.

7. The stored-value card of claim 1, wherein the auxiliary member is rotatably coupled to the base substrate and is rotatable between the first and the second position.

8. The stored-value card of claim 1, wherein the auxiliary member and the base substrate are coaxially aligned with one another.

9. The stored-value card of claim 1, wherein the auxiliary member defines an outer dimension smaller than an outer dimension of the base substrate.

10. The stored-value card of claim 1, wherein the first graphic portion is one of a plurality of first graphic portions included on the auxiliary member.

11. The stored-value card of claim 10, wherein the stored-value card defines a plurality of second graphic portions configured to selectively align with the plurality of first graphic portions to at least partially define a first plurality of graphics including the first graphic when the auxiliary member is in the first position.

12. The stored-value card of claim 11, wherein the auxiliary member is in the second position, the plurality of second graphic portions align with the plurality of first graphic portion to at least partially define a second plurality of graphics including the second graphic.

13. The stored-value card of claim 1, wherein the first graphic is one of a character, an object, and a phrase.

14. The stored-value card of claim 1, wherein base substrate and the auxiliary member are both substantially planar.

15. The stored-value card of claim 1, wherein the first graphic includes a first pictorial character, and the second graphic includes a second pictorial character.

16. A financial transaction card comprising:
- means for illustrating a first element;
- means for illustrating a second element;
- means for supporting the means for illustrating the first element, the means for supporting including means for associating the financial transaction card with a financial account or a financial record; and
- means for coupling the means for illustrating the first element with at least the means for supporting to allow movement of the means for illustrating the first element relative to the means for supporting, wherein the means for coupling positions the means for illustrating the first element such that the first element and the second element are adjacent one another is a first position.

17. The financial transaction card of claim 16, wherein the means for illustrating the first element illustrates the first element for each of a plurality of pictorial representations, and the means for illustrating the second element illustrates a second element for each of the plurality of pictorial representations.

18. The financial transaction card of claim 16, wherein the means for supporting includes the means for illustrating the second element.

19. The financial transaction card of claim 16, further comprising means for illustrating a third element, wherein the means for illustrating the third element is movably coupled with the means for illustrating the first element and the base substrate, the third element being configured to illustrate a portion of the first pictorial representation when the means for illustrating the element is in the first position and the means for illustrating the third element is in a corresponding first position.

20. A method of assembling a stored-value card, the method comprising:
- positioning a first substantially planar member to align with a second substantially planar member, the first member including an account identifier linking the stored-value card to at least one of a financial account and a financial record, and the second member including a first graphic element; and
- coupling the first member to the second member such that the second member is movable relative to the first member between a first position, in which the first graphic element is adjacent a second graphic element of the stored-value card to at least partially depict a first graphic, and a second position, in which the first graphic element is spaced from the second graphic element.

21. The method of claim 20, wherein positioning includes coaxially positioning the first member with respect to the second member, and coupling includes rotatably coupling the first member to the second member.

22. A stored-value card comprising:
- a base substrate including an account identifier linking the stored-value card to at least one of a financial account or a financial record;
- an auxiliary member including a first character portion;
- a connection device securing the base substrate to the auxiliary member in a manner allowing the auxiliary member to move relative to the base member while the auxiliary member remains secured to the base substrate;
- wherein while secured to the base substrate, the auxiliary member is movable between a first position relative to the base substrate, in which the first character portion partially defines a first character, and a second position relative to the base substrate, in which the first character portion partially defines a second character.

23. The stored-value card of claim 22, wherein the base substrate defines a second character portion and a third character portion, and wherein when in the first position, the first character portion aligns with the second character portion to at least partially define the first character, and when in the second position, the first character portion aligns with the third character portion to at least partially define the second character.

24. The stored-value card of claim 22, wherein the auxiliary member is a first auxiliary member, the stored-value card further comprising a second auxiliary member secured to the first auxiliary member such that the second auxiliary member is movable relative to at least one of the base substrate and the first auxiliary member while secured thereto.

25. The stored-value card of claim 24, wherein the connection device secures the second auxiliary member to the base substrate.

26. The stored-value card of claim 25, wherein the base substrate, the first auxiliary member and the second auxiliary member are coaxially aligned with one another about the connection device.

27. The stored-value card of claim 26, wherein the first auxiliary member and the second auxiliary member each rotate relative to the base substrate about the connection device.

28. The stored-value card of claim 27, wherein the first character comprises a face, and the first character portion is a first portion of the face.

* * * * *